United States Patent [19]
Takashi et al.

[11] Patent Number: 5,232,550
[45] Date of Patent: Aug. 3, 1993

[54] VACUUM DRYING METHOD

[75] Inventors: Itoh Takashi, Machida; Ohkawara Masaaki, Yokohama, both of Japan

[73] Assignee: Ohkawara Kakohki Co., Ltd., Japan

[21] Appl. No.: 765,491

[22] Filed: Sep. 26, 1991

Related U.S. Application Data

[63] Continuation of Ser. No. 245,319, Aug. 5, 1988, abandoned.

[30] Foreign Application Priority Data

Apr. 27, 1987 [JP] Japan ................................ 62-103803

[51] Int. Cl.$^5$ ............................ B01D 1/14; B01D 1/18
[52] U.S. Cl. ............................... 159/48.1; 34/5;
   34/15; 34/22; 34/92; 159/3; 159/DIG. 16;
   203/90; 203/91
[58] Field of Search ................. 159/DIG. 10, 3, 48.1,
   159/DIG. 16; 203/49, 90, 91; 202/205, 236;
   34/22, 15, 5, 92; 106/310

[56] References Cited

U.S. PATENT DOCUMENTS

| | | | |
|---|---|---|---|
| 2,217,547 | 10/1940 | Hall | 159/48.1 |
| 2,572,857 | 10/1951 | Hall et al. | 159/48.1 |
| 3,450,494 | 6/1969 | Gaiser | 159/2.1 |
| 3,907,512 | 9/1975 | Ziegenhain et al. | 34/22 |
| 3,909,957 | 10/1975 | Passey | 34/92 |
| 3,962,798 | 6/1976 | Jackson | 34/9 |
| 4,138,424 | 2/1979 | Maekawa et al. | 560/352 |
| 4,219,669 | 8/1980 | Tsuchiya et al. | 562/486 |
| 4,230,886 | 10/1980 | Tsuchiya et al. | 562/486 |
| 4,296,072 | 10/1981 | Takacs et al. | 159/DIG. 16 |
| 4,406,750 | 9/1983 | Irvin | 159/2.1 |
| 4,466,202 | 8/1984 | Merten | 34/77 |
| 4,568,258 | 2/1986 | Henderson | 425/10 |
| 4,583,301 | 4/1986 | Crowley et al. | 34/92 |
| 4,893,415 | 1/1990 | Moldrup | 34/92 |

FOREIGN PATENT DOCUMENTS

| | | | |
|---|---|---|---|
| 0002271 | 6/1979 | European Pat. Off. | |
| 991832 | 10/1951 | France | |
| 2132912 | 11/1972 | France | 159/3 |
| 52-28862 | 7/1977 | Japan | |
| 52-38272 | 9/1977 | Japan | |
| 55-86501 | 6/1980 | Japan | |
| 56-16161 | 4/1981 | Japan | |
| 0010301 | 1/1982 | Japan | 159/3 |
| 7505597 | 11/1975 | Netherlands | 159/2.1 |
| 932297 | 7/1963 | United Kingdom | |
| 1191032 | 5/1970 | United Kingdom | |

*Primary Examiner*—Virginia Manoharan
*Attorney, Agent, or Firm*—Parkhurst, Wendel & Rossi

[57] ABSTRACT

A vacuum drying method and wherein a feed liquid is sprayed into a solvent vapor before being introduced into a vacuum chamber for vacuum evaporation, whereby a powder having spherical particles is produced. Moreover, the amount of solvent remaining in the powder obtained is small.

2 Claims, 2 Drawing Sheets

VACUUM DRYING METHOD

This is a continuation of application Ser. No. 07/245,319 filed Aug. 5, 1988, now abandoned.

FIELD OF THE INVENTION

The present invention relates to a vacuum drying method and apparatus. More particularly, the present invention relates to a vacuum drying method and apparatus which can produce a powder containing a very small amount of a residual solvent and comprising spherical particles having an average particle diameter of 500 μm or below.

BACKGROUND

As a vacuum drying apparatus for obtaining a powder by continuously removing volatile components from a feed liquid or slurry containing solid components (e.g. polymer), there is known, for example, an apparatus as shown in FIG. 3 (see, for example, Japanese Utility Model Publication No.28862/1977, Japanese Utility Model Publication No.16161/1981 and Japanese Patent Publication No. 38272/1977).

In this apparatus, a feed liquid 2 in a feed liquid chamber 1 is continuously sent to a long tube heater 4 by a pump 3 and heated therein; then, the feed liquid 2 is introduced into a vacuum chamber 5 from the side and subjected to vacuum evaporation, whereby a powder is produced.

In the above apparatus, the amount of solvent remaining in the powder obtained can be made very small (e.g. 1% by weight or below) by appropriately selecting such conditions as temperature, flow rate, vacuum and the like. However, the particles constituting the powder obtained become agglomerate when a feed liquid containing a polymer, etc. is used and takes various forms (e.g. an agglomerate having a pulverized stone shape) when a slurry containing a polymer, etc. is used. When in the above conventional apparatus the feed liquid is sprayed from a nozzle, the resulting powder always comprises scaly particles of, for example, 5 μm in thickness, 20 μm in width and 200 μm in length and it is impossible to obtain a powder comprising spherical particles having an average particle diameter of 500 μm or below and containing a residual solvent in an amount of 1% by weight or below (these conditions are required in order for a powder to be preferably used in a powder coating, etc.).

Hence, the present invention was completed in order to solve the above-mentioned problems of the prior art.

An object of the present invention is to provide a vacuum drying method capable of obtaining a powder containing a residual solvent in an amount of, for example, 1% by weight or below and comprising spherical particles having an average particle diameter of 500 μm or below, as well as an apparatus therefor.

Further objects and advantages of the present invention will become apparent from the following description.

SUMMARY OF THE INVENTION

According to the present invention, a vacuum drying method is provided wherein a feed liquid comprising a main component(s) and a solvent(s) is heated and then subjected to vacuum evaporation in a vacuum chamber to produce a powder. The method is characterized in that the feed liquid is sprayed, before being introduced into the vacuum chamber, into a superheated solvent vapor zone to finally obtain a powder containing a very small amount of a residual solvent and comprising spherical particles. The method is also characterized by a vacuum drying, wherein a heated feed liquid is sprayed into a superheated solvent vapor zone and then introduced into a vacuum chamber to vacuum-evaporate the volatile component (i.e. solvent) contained in the feed liquid and thereby to produce a powder. The apparatus is characterized in that the vacuum chamber is provided, at the upstream side, with a nozzle for spraying the feed liquid and a solvent-feeding pipe surrounding the nozzle.

DETAILED DESCRIPTION OF THE PREFERRED EMBODIMENTS

Figure 1:
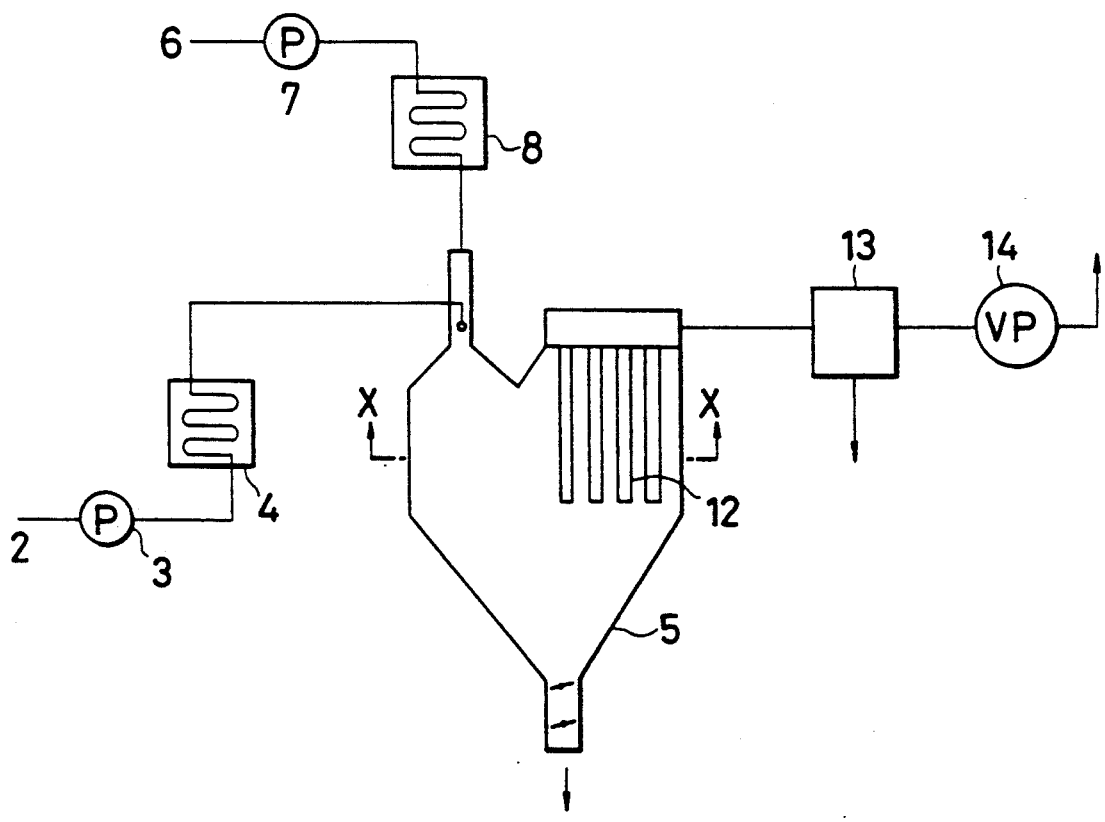
FIG. 1 is a schematic view showing an example of the vacuum drying apparatus of the present invention.
Figure 2:
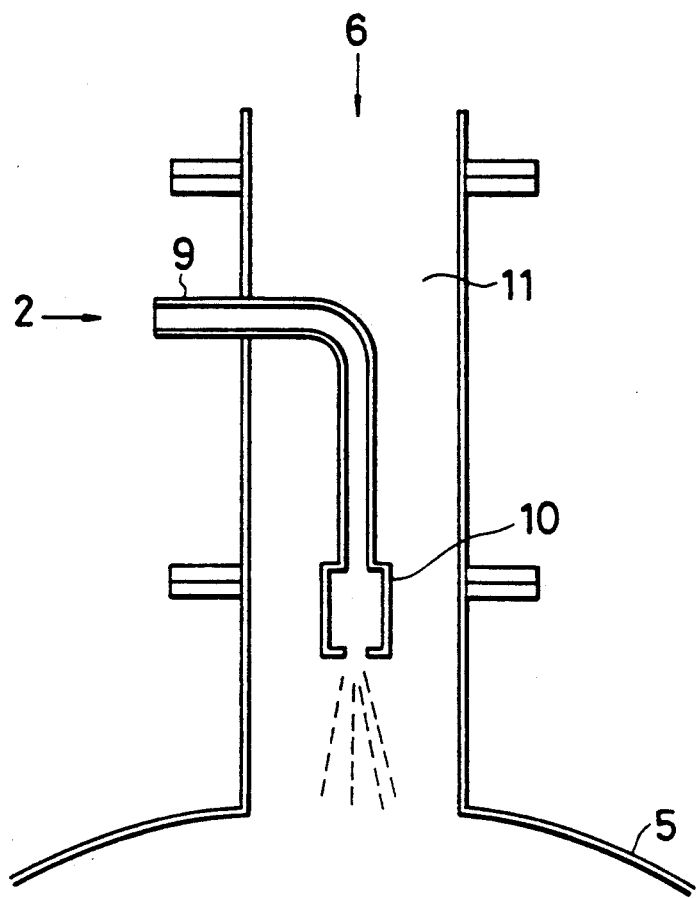
FIG. 2 is a partially enlarged view of FIG. 1.
Figure 3:
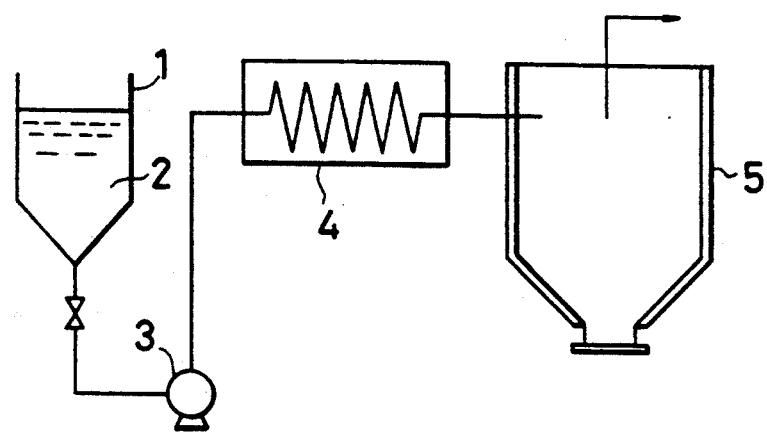
FIG. 3 is a view showing a conventional vacuum drying apparatus.

In FIG. 1 and FIG. 2, a feed liquid 2 is sent to a long tube heater 4 by a pump 3, and a solvent 6 is sent to a long tube heater 8 by a pump 7. The solvent 6 is superheated to a superheated vapor state in the heater 8, and the superheated solvent vapor forms a solvent vapor zone of high temperature and high velocity in a section succeeding the heater 8. The feed liquid 2 is heated to a desired temperature in the heater 4 and then is sprayed into a vacuum chamber 5. In this case, as shown in FIG. 2, a front end (a nozzle for atomization) 10 of a pipe 9 for feeding the feed liquid 2, is inserted into a portion of a solvent vapor zone 11 close to the vacuum chamber 5 (the zone 11 extends from the long tube heater 8 to the vacuum chamber 5). The feed liquid 2 is injected from the nozzle 10 into the solvent vapor zone 11 and both the injected feed liquid 2 and the vapor of the solvent 6 are fed into the vacuum chamber 5 at a velocity of about 100 m/sec. The feed liquid in the vacuum chamber 5 is subjected to vacuum evaporation, whereby the volatile component in the feed liquid is removed and a desired powder product is obtained.

The gas which is generated in the vacuum chamber 5 as a result of the vacuum evaporation is passed through a bag filter 12 provided within the vacuum chamber 5 to remove accompanying particles, and then leaves the vacuum chamber 5. Thereafter, the gas is passed through a condenser 13 to recover the accompanying solvent and then discharged to outside, element 14 being a vacuum pump.

As seen above in this example, the nozzle 10 of the pipe 9 for feeding the feed liquid 2 is inserted into the portion close to the vacuum chamber 5, of the solvent vapor zone 11 extending from the long tube heater 8 to the vacuum chamber 5. The feed liquid 2 which has been heated to about 150 deg.C., is injected from the nozzle 10 into the solvent vapor 6 (the solvent vapor zone 11) to form fine spherical particles. The particles are fed into the vacuum chamber 5 and subjected to vacuum evaporation to remove the volatile component contained in the particles. As a result, the powder obtained from the vacuum evaporation comprises spherical particles (different from conventional scaly or agglomerate particles), having particle diameters of 500 μm or less and contains a very small amount of a residual solvent.

As the feed liquid, a liquid comprising a solid, non-volatile or low-volatile component (main component) and a volatile component (solvent) can be used. Using, for example, a liquid comprising a coating component, as the feed liquid, is preferable, because in the present invention a powder obtained contains a residual solvent in an amount of 1% by weight or less and comprises spherical particles having particle diameters of 500 μm or less. Accordingly, the powder can be used by itself as a final powder coating.

Investigations were conducted on the temperatures and amounts of the feed liquid and the solvent before entering the vacuum chamber and the following matters were determined. That is, it is desirable that the temperature of the solvent be at least 10 deg.C. higher than the boiling point of the solvent at the pressure within the vacuum chamber and that the amount of the solvent 6 be 0.5-5 times, preferably 0.7-3 times the amount of the solvent contained in the feed liquid.

When the temperature of the solvent is lower than the boiling point of the solvent at the pressure within the vacuum chamber +10 deg.C.) or when the amount of the solvent 6 is smaller than 0.5 time the amount of the solvent contained in the feed liquid, the amount of the residual solvent in the resulting product is larger. Meanwhile, when the amount of the solvent 6 is larger than 5 times the amount of the solvent contained in the feed liquid, the resulting product comprises an increased amount of randomly shaped particles and a reduced amount of spherical particles.

Specific examples for producing a powder product from a feed liquid and solvent are discussed as follows.

EXAMPLE 1

Vacuum drying of a feed liquid was effected using a vacuum chamber as shown in FIG. 1 (the X—X section of the upper portion has a rectangular shape of 2,000×1,000 mm and the height of the upper portion is 2,000 mm).

The following operational conditions were employed.

| Feed liquid: | |
| --- | --- |
| Epoxy resin (soluble in solvent) | 20% by weight |
| Inorganic pigment (insoluble in solvent) | 13% by weight |
| Solvent (Methyl ethyl ketone, boiling point: | 79.6 deg. C.) 67% by weight |
| Softening point of epoxy resin: | about 90 deg. C. |
| Treated amount of feed liquid: | 7 kg/hr (treated amount of solvent in feed liquid: 4.7 kg/hr) |
| Feed liquid temperature: | 150 deg. C. |
| Fed amount of solvent: | 5 kg/hr (1.06 times the treated amount of solvent in feed liquid) |
| Solvent temperature: | 150 deg. C. |
| Boiling point at pressure within vacuum chamber: | −3 deg. C. |
| Vacuum within vacuum chamber: | 20 Torr |

Incidentally, the wall of the vacuum chamber 5 was heated to 40 deg.C. by a jacket (not shown).

As a result of an operation under the above conditions, a powder containing a residual solvent in an amount of 0.7% by weight and comprising spherical particles having an average particle diameter of 50 μm there was obtained.

EXAMPLE 2

Vacuum drying of a feed liquid was effected using a vacuum chamber consisting of a vertical cylinder of 1,000 mm in diameter and 3,000 mm in height and a bag filter annexed to the vacuum chamber, of 1,000 mm in diameter and 2,000 mm in height.

The following operational conditions were employed.

| Feed liquid: | |
| --- | --- |
| Acrylic resin | 15% by weight |
| Filler and coloring agent (consisting mainly of CaCO₃) | 10% by weight |
| Solvent (acetone) | 75% by weight |
| Sprayed amount of feed liquid: | 20 kg/hr (sprayed amount of solvent in feed liquid: 15 kg/hr) |
| Feed liquid temperature: | 120 deg. C. |
| Spraying pressure: | 5 kg/cm² G |
| Vacuum chamber: | |
| Hot water jacket temperature: | 30 deg. C. |
| Vacuum: | 15 Torr |

As a result of an operation under the above conditions, the following results were obtained.

| | Example 2 |
| --- | --- |
| Fed amount of solvent (kg/hr) | 30 |
| Solvent temperature (deg. C.) | 150 |
| Main shape of particles | Spherical |
| Average particle size (μm) | 60 |
| Amount of residual solvent (wt. %) | 0.5 |

As is clear from the above, a powder comprising spherical particles and containing a residual solvent in a very small amount of 0.5% by weight was obtained.

It was found as a general tendency that when the amount of solvent fed is decreased, the resulting powder comprises ellipsoidal particles and contains a larger amount of a residual solvent and when the amount of solvent fed is increased, the resulting powder comprises scaly particles.

APPLICABILITY IN INDUSTRY

As described above, in the vacuum drying method and apparatus of the present invention, a feed liquid is sprayed into a solvent vapor before being introduced into a vacuum chamber, whereby a powder comprising spherical particles having,, particle diameters of 500 μm or less can be produced, Moreover, the amount of solvent remaining in the powder obtained can be made very small (e.g. 1% by weight or below). Accordingly, the vacuum drying method and apparatus of the present invention are very useful, particularly in production of powder coating, etc.

What is claimed is:

1. A vacuum drying method for forming a powder in a vacuum drying chamber, the method comprising the following steps:
    heating a feed liquid comprising a main component and a solvent;
    superheating a liquid comprising the solvent, at a temperature which is at least 10° C. higher than the boiling point temperature of the solvent when measured at a pressure of said vacuum chamber, to form a vapor of the solvent adjacent to and upstream of said vacuum chamber, wherein the amount of solvent in said vapor is 0.5-5 times the amount of solvent in said feed liquid;
spraying said feed liquid into said vapor; and
vacuum evaporating said feed liquid and said vapor in said vacuum chamber;
whereby a powder having spherical particles and 1 wt % or less of a residual amount of solvent is produced.

2. The vacuum drying method of claim 1, wherein said feed liquid further comprises a solution containing a coating material.

* * * * *